Patented Sept. 21, 1954

2,689,872

UNITED STATES PATENT OFFICE 2,689,872

PROCESS FOR POLYMERIZING CHLORO-TRIFLUOROETHYLENE

Walter A. Denison and Edgar W. Wise, South Charleston, W. Va., assignors to Union Carbide and Carbon Corporation, a corporation of New York No Drawing. Application June 21, 1950, Serial No. 169,536

7 Claims. (Cl. 260—653)

This invention relates to an improved method of producing polymers of chlorotrifluoroethylene which are liquids or greases at room temperature. More particularly it relates to the catalytic polymerization of chlorotrifluoroethylene at high temperature and pressure in the presence of a carbon dioxide diluent.

Polychlorotrifluoroethylene, as a polymer of moderate molecular weight in the form of a liquid or grease, is very useful as a lubricant because of its unusual inertness to chemical attack. In apparatus for handling such substances as oxygen at elevated pressures, hot oxidizing acids, or halogens, the common lubricants are not sufficiently inert, in some instances, to perform satisfactorily. Liquid or grease-like polymers of chlorotrifluoroethylene appear to be capable of filling the need for lubricants in industrial applications where such materials are encountered.

Processes for making moderate molecular weight polymers of chlorotrifluoroethylene, which are liquids or greases at room temperature, are known and involve polymerization of the monomer or thermal degradation of the high molecular weight polymer; but such processes give a rather low yield of lubricant, and the lubricant fraction must be stabilized by fluorination, for instance by heating with cobalt trifluoride.

One object of the present invention is to provide a process for the production of mixed polymers of chlorotrifluoroethylene whereby the yield of the lubricant fraction of the crude polymer may be substantially increased, the amount of catalyst may be greatly reduced, and the lubricant fraction is of improved stability and inertness, as compared to the prior processes.

A still further object is to provide a process wherein the reaction temperature may be greatly increased with a resultant increase in the amount of the lubricant fraction produced in the crude polymer as well as an increase in the amount of crude polymer produced from the monomer.

An additional object is to devise a process wherein oxygen or air may be employed as a polymerization catalyst for chlorotrifluoroethylene.

The invention is based on the discovery that carbon dioxide is an exceedingly effective diluent for chlorotrifluoroethylene during polymerization, permitting the use of polymerization temperatures from 150° C. to 450° C. without danger of decomposition of the monomer. With polymerization temperatures in this range, the rate of polymerization is high, permitting tubular reactors to be employed in a continuous polymerization process.

Carbon dioxide was found to be an inert diluent, serving only to aid in dissipating the heat generated by the polymerization reaction. It does not combine chemically with the polymer molecule during polymerization, as do the reactive diluents (e. g. chloroform) used heretofore, and a reduction may thus be realized in the amount of fluorinating agent subsequently required to stabilize the polymer.

The ratio by weight of the carbon dioxide diluent to the monomer, in the process of the present invention, may be as low as 0.3 to 1 although the polymerization reaction is difficult to control with such a small amount of diluent. Preferably the ratio should be between 1 to 1 and 2 to 1 for maximum benefits in polymer production and ease of reaction control. While a greater ratio than 2 to 1 may be employed without adversely affecting the reaction, no benefit is derived thereby and the cost of diluent is increased and the amount of monomer is decreased for given reaction conditions.

The catalyst used in the present invention is an organic peroxide or hydroperoxide or oxygen. Di-t-butyl peroxide or t-butyl hydroperoxide are preferred.

Additional examples of catalysts of this class which may be employed in the practice of the invention are peracetic acid, and cumene hydroperoxide. Other known organic peroxide or hydroperoxide catalysts, as for example benzoyl peroxide or acetyl peroxide, may also be used effectively, but in some instances these produce slightly less polymer yield.

Oxygen or air, which are detrimental in the prior art process, can be substituted for the peroxide as a catalyst in the process of this invention with highly beneficial results. Not only is the polymer yield good but less fluorination is required.

One advantage of the process of the present invention lies in the relatively small amount of catalyst required to produce a yield of the crude polymer equivalent to that of the prior art process. Using 0.5% or less of peroxide, based on the weight of chlorotrifluoroethylene, yields of 50% or better of the crude polymer may be obtained. This result is realized in the process of the prior art only when 5% to 10% of a peroxied catalyst is used. When, in the process of the present invention, the catalyst concentration is increased to the range of 5% to 10% by weight of the monomer, the crude polymer obtained during polymerization is much richer in the desired lubricant fraction. Yields of oil from the crude are increased to values above 50% and this increase results in marked improvements in the economics of the process. Catalyst concentrations above 10% by weight of the monomer, continue to improve the crude polymer yield in terms of the quantity of polymer produced per period of reaction time, but in general do not further improve the yield of the oil fraction.

The necessity of fluorinating the polychlorotrifluoroethylene with cobalt trifluoride or other suitable fluorinating agents is not completely obviated in the process of the present invention. When the higher catalyst concentrations are used, part of the saving in the fluorination step is sacrificed to obtain a higher yield of the lubricant fraction, but in all cases the amount of fluorination is materially reduced with relation to that required in the prior art process.

The process of the subject invention is a high temperature, high pressure reaction. The temperature should be maintained at 150° C. to 450° C. and preferably between 300° C. and 400° C. The pressure should be maintained at 1000 p. s. i. or above during the course of the reaction; preferably it should be at about 10,000 to 15,000 p. s. i.

The crude polymer of the subject invention is a semi-solid having a grease-like character. When fractionally distilled there is a heads fraction, up to about 100° C. at 1 mm. pressure; and a lubricant fraction, from about 100° C. at 1 mm. to about 200° C. at 1 mm. A small amount of waxy residue generally remains. The heads fraction is too light for a lubricant but it may be employed for other purposes, as for example a hydraulic fluid.

The following examples further illustrate the invention:

EXAMPLE I

A mixture of 1037 grams of chlorotrifluoroethylene, 5.2 ml. of di-t-butyl peroxide, and 1037 grams of carbon dioxide was placed in a steel gas-cylinder having a capacity of 2900 ml. The liquid phase of this mixture was pumped into a steel reaction vessel having a volume of about 50 ml., heated externally to 230° C., until the pressure was 10,000 p. s. i. After 5 minutes, the contents of the reactor was released to atmospheric pressure, and the polymeric material was collected in an open vessel. The process of pumping to 10,000 p. s. i., and releasing the product after 5 minutes was carried out a total of eight times. Sixty grams of a grease-like polymer was collected, representing a yield of about 25%.

EXAMPLE II

A section of $\tfrac{1}{8}$ inch inside diameter steel tubing 40 inches long was equipped for external heating, and the monomer mixture was pumped through the tube, throttling the effluent with a hand valve.

A mixture of 2600 grams of chlorotrifluoroethylene, 5200 grams of carbon dioxide, and 13 grams of t-butyl hydroperoxide was pumped through the apparatus at 2500 p. s. i. during 170 minutes. The jacket temperature was maintained at 400° C. A grease-like polymer weighing 1597 grams was collected, or a yield of 61.5%.

Fractional distillation of the polymer mixture gave a heads fraction, distilling finally at 100° C. at 1 mm., amounting to 39% of the crude polymer; and a lubricant fraction, distilling between 80° at 0.1 mm. and 195° C. at 0.3 mm., amounting to 27% of the crude. The residue was a hard, waxy solid.

EXAMPLE III

The apparatus and procedure of Example II was used.

A mixture of 600 grams of chlorotrifluoroethylene, 1200 grams of $CO_2$ and 3 grams of benzoyl peroxide was pumped through the apparatus at 10,000 p. s. i. in 36 minutes, at 350° C. A white grease weighing 310 grams was collected, or a yield of 52%.

The fractional distillation gave 42% of a heads fraction, distilling up to 100° C. at 1 mm., and 29% of lubricant fraction, distilling between 100° C. at 1 mm. and 235° C. at 1 mm. The residue was a waxy solid.

EXAMPLE IV

Using the apparatus of Example II, a mixture of 1200 grams of carbon dioxide, 1200 grams of chlorotrifluoroethylene, and 6 grams of t-butyl hydroperoxide was fed through the reactor at 10,000 p. s. i., at 365° C., in 40 minutes.

A brown grease-like polymer was collected in an amount of 673 grams, or a yield of 56%. Distillation of the polymer gave a heads fraction of 30%, distilling up to 100° C. at 1 mm.; and a lubricant fraction of 18%, distilling between 100° C. at 1 mm. and 200° C. at 1 mm.

In a similar manner, polymerizations were conducted at 400° C., 300° C., and 250° C. The results are tabulated in Table I. Increasing temperatures resulted in higher yields of crude polymer and the crude polymers obtained were richer in the lubricant fraction distilling from 100° C. at 1 mm. to about 200° C. at 1 mm.

Table I

| $CF_2=CFCl$, Grams | $CO_2$, Grams | t-BuOOH, Weight, Grams | Percent | Pressure, p. s. i. | Temp., ° C. | Time, Min. | Crude Polymer, Weight, Grams | Percent | Oil Fraction, Percent of Crude |
|---|---|---|---|---|---|---|---|---|---|
| 800 | 1,600 | 4 | .5 | 10,000 | 400 | 50 | 505 | 63 | 20 |
| 1,200 | 1,200 | 6 | .5 | 10,000 | 365 | 40 | 673 | 56 | 18 |
| 600 | 1,200 | 3 | .5 | 10,000 | 300 | 47 | 270 | 45 | 13 |
| 800 | 1,600 | 4 | .5 | 10,000 | 250 | 65 | 300 | 38 | 8 |

EXAMPLE V

A series of polymerizations was made using catalyst concentrations varying from 0.5 to 17.5 ml. per 100 gm. of chlorotrifluoroethylene, and the products were fractionally distilled. The lubricant fraction, distilling between 100° C. at 1 mm. and 200° C. at 0.1 mm., became larger as the catalyst content was increased, up to 14.0 ml. per 100 gm. The relationship is depicted in Table II.

Table II

| $CF_2=CFCl$, grams | $CO_2$, grams | Ml., t-BuOOH per 100 grams $CF_2=CFCl$ | Pressure, p. s. i. | Temp., °C. | Time, Min. | Crude Polymer, Weight, grams | Percent | Oil Fraction Weight, grams | Oil Fraction Percent of Crude |
|---|---|---|---|---|---|---|---|---|---|
| 800 | 1,600 | 0.5 | 10,000 | 350 | 50 | 256 | 33 | 33 | 13 |
| 600 | 1,200 | 1.0 | 10,000 | 350 | 32 | 460 | 77 | 112 | 24 |
| 600 | 1,200 | 2.0 | 10,000 | 350 | 28 | 367 | 61 | 140 | 38 |
| 600 | 1,200 | 3.0 | 5,000 | 350 | 38 | 305 | 51 | 134 | 44 |
| 600 | 1,200 | 4.0 | 3,000 | 350 | 38 | 355 | 59 | 185 | 52 |
| 600 | 1,200 | 5.0 | 3,000 | 350 | 35 | 290 | 48 | 167 | 58 |
| 600 | 1,200 | 6.0 | 2,000 | 350 | 40 | 290 | 48 | 176 | 60 |
| 600 | 1,200 | 7.0 | 2,000 | 350 | 63 | 300 | 50 | 186 | 62 |
| 600 | 1,200 | 8.0 | 2,000 | 350 | 35 | 250 | 42 | 161 | 64 |
| 600 | 1,200 | 10.0 | 3,000 | 350 | 34 | 261 | 44 | 155 | 59 |
| 600 | 1,200 | 14.0 | 3,000 | 350 | 57 | 253 | 42 | 152 | 60 |
| 600 | 1,200 | 15.0 | 2,000 | 350 | 28 | 257 | 43 | 139 | 50 |
| 600 | 1,200 | 17.5 | 3,000 | 350 | 42 | 382 | 64 | 177 | 46 |

EXAMPLE VI

A sample of 4800 grams of chlorotrifluoroethylene, 9600 grams of carbon dioxide, and 90 grams of air was charged to a steel cylinder. The mixture was pumped through the apparatus of Example II at 380° C. and 15,000 p. s. i. during 260 minutes. A polymer weighing 2212 grams was collected. Fractional distillation of the polymer gave 458 grams of a lubricant fraction distilling between 100° C. at 1 mm. to 260° C. at 0.1 mm. This distilled fraction was fluorinated by heating to 200° C. with 137 grams of cobalt trifluoride. The fluorinated liquid did not reduce a 2% aqueous solution of potassium permanganate in 10 minutes at room temperature.

EXAMPLE VII

A fractionated polymer of chlorotrifluoroethylene, described in Example II was stabilized by reaction with cobalt trifluoride. The polymer fraction selected distilled between 80° C. at 0.1 mm. to 195° C. at 0.3 mm., amounting to 27% of the crude polymer. This fraction had a molecular weight of 770, viscosity of 97.2 centistokes at 100° F. (449 S. U. S.), a chlorine content of 31%, and was unsaturated, as indicated by test with 2% aqueous permanganate.

The unsaturation was removed by treatment with cobalt trifluoride, as follows: A 20 gram portion of the polymer was mixed with 6 grams of $CoF_3$, in portions of 2 grams each, and heated to 200° C. after each addition. The reaction was done in a nickel crucible, and the mixture was stirred by hand, using a spatula. The brown $CoF_3$ disappeared, and bright purple crystals of $CoF_2$ formed. A portion of the supernatant liquid polymer was tested with permanganate after each addition. The permanganate was reduced after each addition except the last.

EXAMPLE VIII

A sample of 600 grams of chlorotrifluoroethylene, 180 grams of carbon dioxide, and a peroxide consisting of a mixture of two-thirds t-butyl hydroperoxide and one-third di-t-butyl peroxide, in the amount of 5 ml. of t-butyl hydroperoxide per 100 grams of chlorotrifluoroethylene, was reacted at 150° C. and 2000 p. s. i. for 12 minutes. A crude polymer weighing 260 grams was collected, or a yield of 43%. The lubricant fraction distilling between 100° C. at 1 mm., and 200° C. at 0.1 mm. amounted to 84 grams, or a yield of 32% by weight of the crude.

We claim:

1. The process of polymerizing chlorotrifluoroethylene to a liquid to grease-like polymer which comprises reacting said chlorotrifluoroethylene under conditions of heat and pressure and in the presence of carbon dioxide and a catalyst of the group consisting of an organic peroxide, an organic hydroperoxide, and oxygen, the ratio of said carbon dioxide to said chlorotrifluoroethylene being at least 0.3 to 1, said pressure being at least 1000 p. s. i. and said temperature being at least 150° C.

2. The process of polymerizing chlorotrifluoroethylene to a liquid to grease-like polymer which comprises reacting said chlorotrifluoroethylene in the presence of a catalyst and a diluent of carbon dioxide; the ratio by weight of said carbon dioxide to said chlorotrifluoroethylene being at least 0.3 to 1; said catalyst being one of the group consisting of an organic peroxide, an organic hydroperoxide, an oxygen, and being present in an amount of between 0.5% and 10% by weight of said chlorotrifluoroethylene: the reaction temperature being between 150° C. and 450° C.; and the reaction pressure being at least 1000 p. s. i.

3. The process of polymerizing chlorotrifluoroethylene according to claim 2 wherein said catalyst is one of the group consisting of di-t-butyl peroxide, t-butyl hydroperoxide, and oxygen.

4. The process of polymerizing chlorotrifluoroethylene to a liquid to grease-like polymer which comprises reacting said chlorotrifluoroethylene in the presence of a catalyst and a diluent of carbon dioxide; the ratio by weight of said carbon dioxide to said chlorotrifluoroethylene being between 1 to 1 and 2 to 1; said catalyst being one of the group consisting of an organic peroxide, an organic hydroperoxide, and oxygen, and being present in an amount between 0.5% and 10% by weight of said chlorotrifluoroethylene; the reaction temperature being between 300° C. and 400° C.; and the reaction pressure being between 10,000 p. s. i. and 15,000 p. s. i.

5. The process of polymerizing chlorotrifluoroethylene according to claim 4 wherein said catalyst is one of the group consisting of di-t-butyl peroxide, t-butyl hydroperoxide, and oxygen.

6. The process of polymerizing chlorotrifluoroethylene to a liquid to grease-like polymer which comprises reacting said chlorotrifluoroethylene in the presence of a catalyst and a diluent of carbon dioxide; the ratio by weight of said carbon dioxide to said chlorotrifluoroethylene being between 1 to 1 and 2 to 1; said catalyst being one of the group consisting of di-t-butyl peroxide, t-butyl hydroperoxide, and oxygen, and being present in an amount between 0.5% and 10% by weight of said chlorotrifluoroethylene; the reaction temperature being between 150° C. and 450° C. and said reaction pressure being between 1000 p. s. i. and 15,000 p. s. i.

7. The process of polymerizing chlorotrifluoroethylene to a liquid to grease-like polymer which comprises reacting said chlorotrifluoroethylene in the presence of carbon dioxide as a diluent and oxygen as a catalyst at a temperature above 150° C. and a pressure above 1000 p. s. i., the ratio of said carbon dioxide to said chlorotrifluoroethylene being at least 0.3 to 1.

References Cited in the file of this patent

UNITED STATES PATENTS

| Number | Name | Date |
| --- | --- | --- |
| 2,426,476 | Vaughn et al. | Aug. 26, 1947 |
| 2,482,877 | Schmerling | Sept. 27, 1949 |
| 2,602,824 | Padbury et al. | July 8, 1952 |

FOREIGN PATENTS

| Number | Country | Date |
| --- | --- | --- |
| 465,520 | Great Britain | May 3, 1937 |

OTHER REFERENCES

Miller et al.: "Ind. and Eng. Chem.," vol. 39, pp. 333–7 (1947).

Belmore et al.: Ibid, pp. 338–42, vol. 39 (1947).